United States Patent
Godfrey et al.

(10) Patent No.: US 6,662,217 B1
(45) Date of Patent: Dec. 9, 2003

(54) DISTRIBUTED AND AUTOMATED TEST ADMINISTRATION SYSTEM FOR ADMINISTERING AUTOMATED TESTS ON SERVER COMPUTERS OVER THE INTERNET

(75) Inventors: Tony D Godfrey, Redmond, WA (US); Eric Nace, Fairbanks, AK (US)

(73) Assignee: Microsoft Corporation, Redmond, WA (US)

( * ) Notice: Subject to any disclaimer, the term of this patent is extended or adjusted under 35 U.S.C. 154(b) by 0 days.

(21) Appl. No.: 09/234,269

(22) Filed: Jan. 19, 1999

(51) Int. Cl.[7] .............................................. G06F 13/00
(52) U.S. Cl. ................. 709/219; 703/203; 703/313; 703/329
(58) Field of Search ................. 709/203, 206, 709/217, 219, 313, 328, 329

(56) References Cited

U.S. PATENT DOCUMENTS

| | | | | |
|---|---|---|---|---|
| 5,909,589 A | * | 6/1999 | Parker et al. ................. 712/32 |
| 6,029,257 A | * | 2/2000 | Palmer ......................... 714/40 |
| 6,069,873 A | * | 5/2000 | Pugaczewski et al. ...... 370/241 |
| 6,078,948 A | * | 6/2000 | Podgorny et al. ........... 709/204 |
| 6,138,157 A | * | 10/2000 | Welter et al. ................ 709/224 |
| 6,175,833 B1 | * | 1/2001 | West et al. .................. 707/102 |
| 6,205,413 B1 | * | 3/2001 | Bisdikian et al. ............. 703/24 |

* cited by examiner

*Primary Examiner*—Viet D. Vu
(74) *Attorney, Agent, or Firm*—Lee & Hayes, PLLC

(57) ABSTRACT

A distributed test administration architecture enables a system administrator to test one or more servers accessible by the Internet from a remote administration computer that implements a browser. The architecture includes a testing application at the central testing server and a testing service installed on every registered client and server. Through a Web browsing interface, the system administrator can select participating clients and servers that are registered with the testing server, establish the tests to be run and the order in which to run them, and to launch the tests. The testing server coordinates execution of the tests by sending HTTP messages to and from the testing service at the participating clients and servers. The testing service runs the tests, gather results, and returns the results to the testing server. The testing server can then present the results to the administrator through a status Web page.

43 Claims, 10 Drawing Sheets

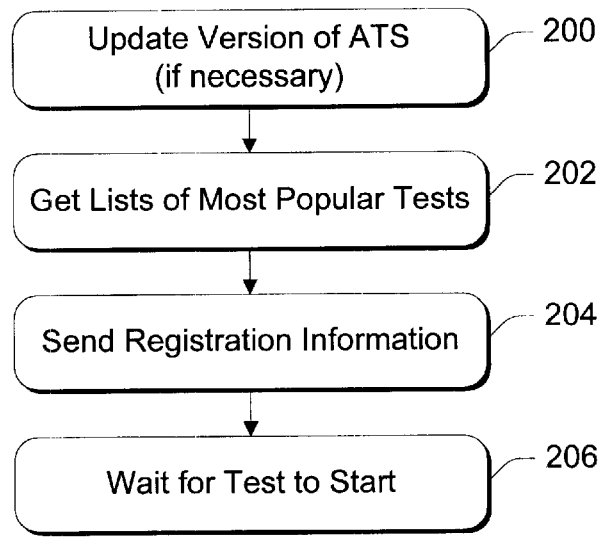
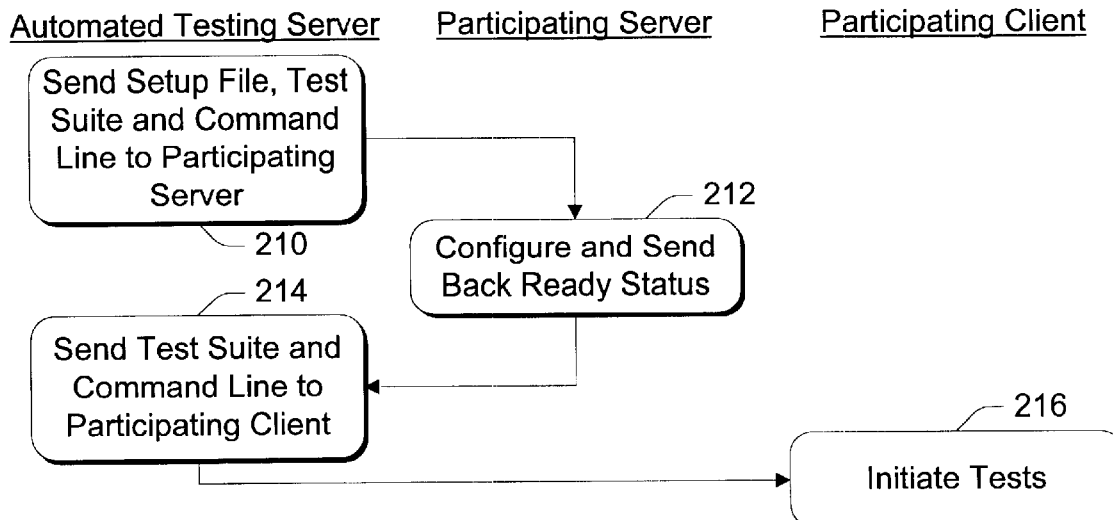

DISTRIBUTED AND AUTOMATED TEST ADMINISTRATION SYSTEM FOR ADMINISTERING AUTOMATED TESTS ON SERVER COMPUTERS OVER THE INTERNET

TECHNICAL FIELD

This invention relates to systems for stress and general testing of server computers. More particularly, the invention relates a distributed and automated test administration system that administers stress and functional tests running on one or more registered client computers against one or more registered server computers, either of which may be located anywhere on the Internet. Moreover, the system enables a system administrator to administer these tests from a remote location using only a browser-based computer.

BACKGROUND

Traffic on the Internet is growing at a rapid pace. With millions of users visiting a growing number of sites each day, the computer systems that form the Web sites are being asked to serve more and more clients. Web site administrators are continually evaluating their systems to improve performance and efficiency in better servicing their clients. Such evaluations help the administrator learn whether the server software is running properly, whether more or less resources are needed to properly service the demand, and so forth.

System administrators typically administer stress tests on their server computers at the Web site. The administrators configure the tests, run them, and oversee the results while on location at the site. Unfortunately, this on-location requirement has a number of drawbacks in that it requires very knowledgeable administrators who are familiar with each test to be at the site anytime a test is to be run. If the administrator happens to be sick or on vacation, or worse, has left the company, it is very difficult for someone else to come in and execute the tests.

Accordingly, there is a need for a testing architecture that provides some automation of the testing process and enables a system administrator to administer the tests from a remote location.

Apart from Web servers, applications are also becoming more complex, requiring more extensive testing. There is a clear need for a way to organize and execute tests, without necessarily having to add resources to execute those tests. As tests grow in number, it also becomes more difficult to know how each test runs and how it reports results. There is also a need to standardize test execution and reporting.

SUMMARY

This invention concerns a distributed and automated test administration architecture that allows a system administrator to administer, from a remote browser-based computer, automated tests on registered server computers located anywhere on the Internet. The architecture has distributed software components that are coordinated using standard IP (Internet protocol) messaging, such as HTTP (hypertext transport protocol) messages.

According to one implementation, the distributed test administration system includes a central testing server, a remote administration client, one or more registered clients, and one or more registered servers. The software architecture that implements the system has components located at the central testing server, the registered clients, and the registered servers. A conventional browser is all that is required at the remote administration client.

The centralized testing server allows the system administrator (or anyone) using a Web browser to initiate tests on any registered clients and servers. The testing server has a testing application to generate a test page that can be served to the browser at the remote administration client over the Internet (or other IP network). The test page contains test information and functionality that, when rendered by the browser, enables the system administrator to specify at least one test, at least one participating server from among the registered servers, and at least one participating client from among the registered clients. The test parameters are returned in an HTTP message from the browser to the central testing server.

The Web page interface facilitates easy test administration for even people who are not intimately familiar with the tests. Non-technical people can configure tests for selected machines using a point-and-click interface and then launch the tests with a single click of a button. A system administrator (or anyone) can call upon otherwise idle machines at the click of a button to run a test. Tests can also be executed in an automated fashion at a specified time.

The testing application at the central testing server has a coordination system that coordinates execution of the test on the participating client and the participating server. In one implementation, the coordination system is a queue structure that queues events in an preferred order of execution. The testing application pops an event from the queue structure and sends an HTTP message to the participating server or the participating client in response to that event. Such events include setting up the participating server, starting the tests, and cleaning up the participating server after the tests are complete.

The central testing server can be configured to automatically kick-off stress or functional tests on machines at a given time. For instance, the machines can run tests during off hours, and report results by the time the administrators arrive at work.

Test execution information and test data are passed over the Internet via normal HTTP requests so the platform of a client or server can be unknown to the central testing server. The architecture is independent of the tests being run against a product as it essentially allows execution of any tests for any product. Yet, the architecture defines a common interface for test execution.

The software architecture also includes an automated testing service (ATS) installed on every registered client and server. The ATS allows the computers to be utilized as servers, clients, or both. The testing service is invoked to run the tests on the participating client and participating server. The testing service is responsive to the HTTP messages received from the testing application to perform the test and gather test results from the tests. The testing service also sends HTTP messages containing the test results back to the testing application at the central testing server.

A database resides at the central testing server to store the test results received from the testing services. The testing application generates a status page that, when rendered by the browser, presents the test results from running the tests on the participating clients and the participating servers.

One of the advantages of continuously recording test results and collecting it as done in this design is with enough history (data warehousing) one can begin to see patterns in the product (quality trends) and monitor the stability of a particular. feature of the application being tested (data mining). This aids in quality assurance and insures that product goals are being met. Other types of information can be attained from raw test status data—is the product in line with shipping dates, are members of the group adhering the guidelines laid out for the building process, are there sections of the product that need more resources, and the list goes on.

BRIEF DESCRIPTION OF THE DRAWINGS

FIG. 7 is a flow diagram showing steps in a startup process for starting up a service running at the registered clients and servers.

FIG. 8 is a flow diagram showing steps in a setup process for setting up and running various stress tests.

DETAILED DESCRIPTION

This invention concerns an architecture that allows a system administrator to administer stress and other automated tests on computers located anywhere on the Internet from a remote location equipped with a browser-enabled computer. The architecture permits the system administrator to select participating server(s) and client(s) to administer automated tests on the participating server(s) and client(s). The system administrator also receives periodic status updates during the tests.

The implementation described below is discussed in the context of stress testing a Web server. However, this architecture is not restricted to testing Web servers, but can be used to test any piece of software.

Administration Architecture

Figure 1:
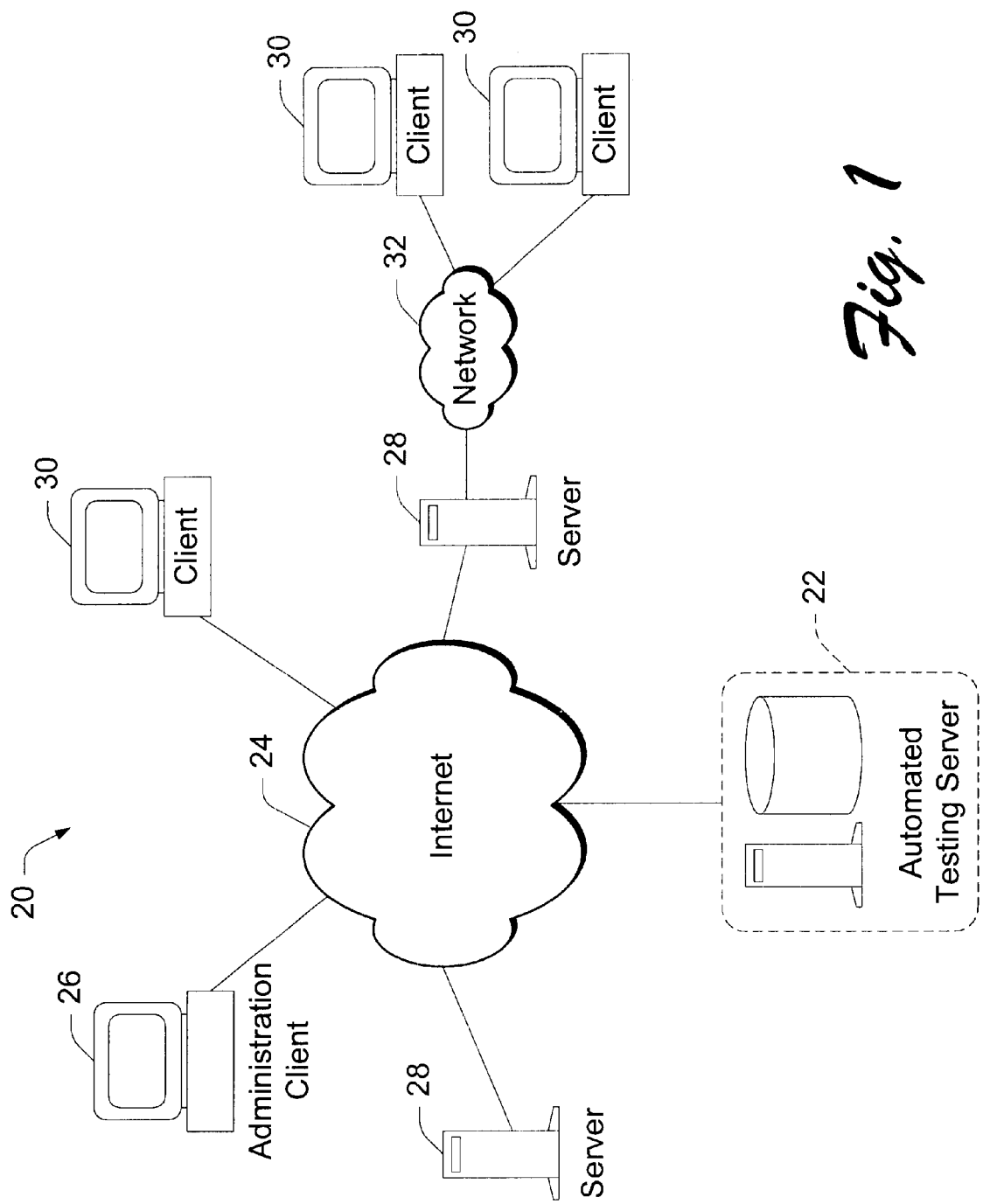
FIG. 1 shows a distributed and automated administration system for administering stress tests on server computers over the Internet.

FIG. 1 shows a distributed and automated administration system 20 having an automated central testing server 22 that facilitates computer administration of any registered computer accessible (directly or indirectly) by the Internet 24 on behalf of a system administrator who is located remotely at an administration client 26. The administration client 26 is a browser-based computer that accesses the central testing server 22 using standard Internet messaging, such as HTTP (hypertext transport protocol) based messages.

The administration client 26, through the central testing server 22, initiates and monitors various stress and automated tests that examine the operation and interaction of server and client computers. As illustrated in FIG. 1, representative computers include servers 28 and clients 30. The clients may be coupled to the Internet 22 directly (or via an Internet service provider) or indirectly via a server to a secondary network 32 (e.g., LAN, WAN, cable, telephone, etc.). The architecture enables testing of any computer directly or indirectly connected to the Internet 22.

Computers avail themselves to the testing process by initially registering with the central testing server 22. During registration, a piece of software, referred to as the "automated testing service" or "ATS", is loaded onto every registered server and client computer 28 and 30. The automated testing service helps run tests locally at the computer and in conjunction with a participating server and facilitates communication with the central testing server 22.

When a remote administrator wishes to run a series of tests on particular computers, he/she uses the browser-based computer 26 to access the central testing server 22. The central testing server 22 serves one or more HTML (hypertext markup language) pages that contain a list of tests and lists of registered clients and servers registered with the central testing server. Using the browser interface, the system administrator can select the tests, the order in which the tests are run, and the clients and servers that will participate in the tests.

The central testing server 22 prepares the selected clients and servers for the tests by initializing the automated testing services. The participating clients and servers run the tests stipulated by the system administrator and occasionally return status updates to the central testing server, which subsequently serves the status information to the administration client in the form of HTML pages. After the tests complete, the central testing server 22 cleans up participating clients and servers.

Figure 2:
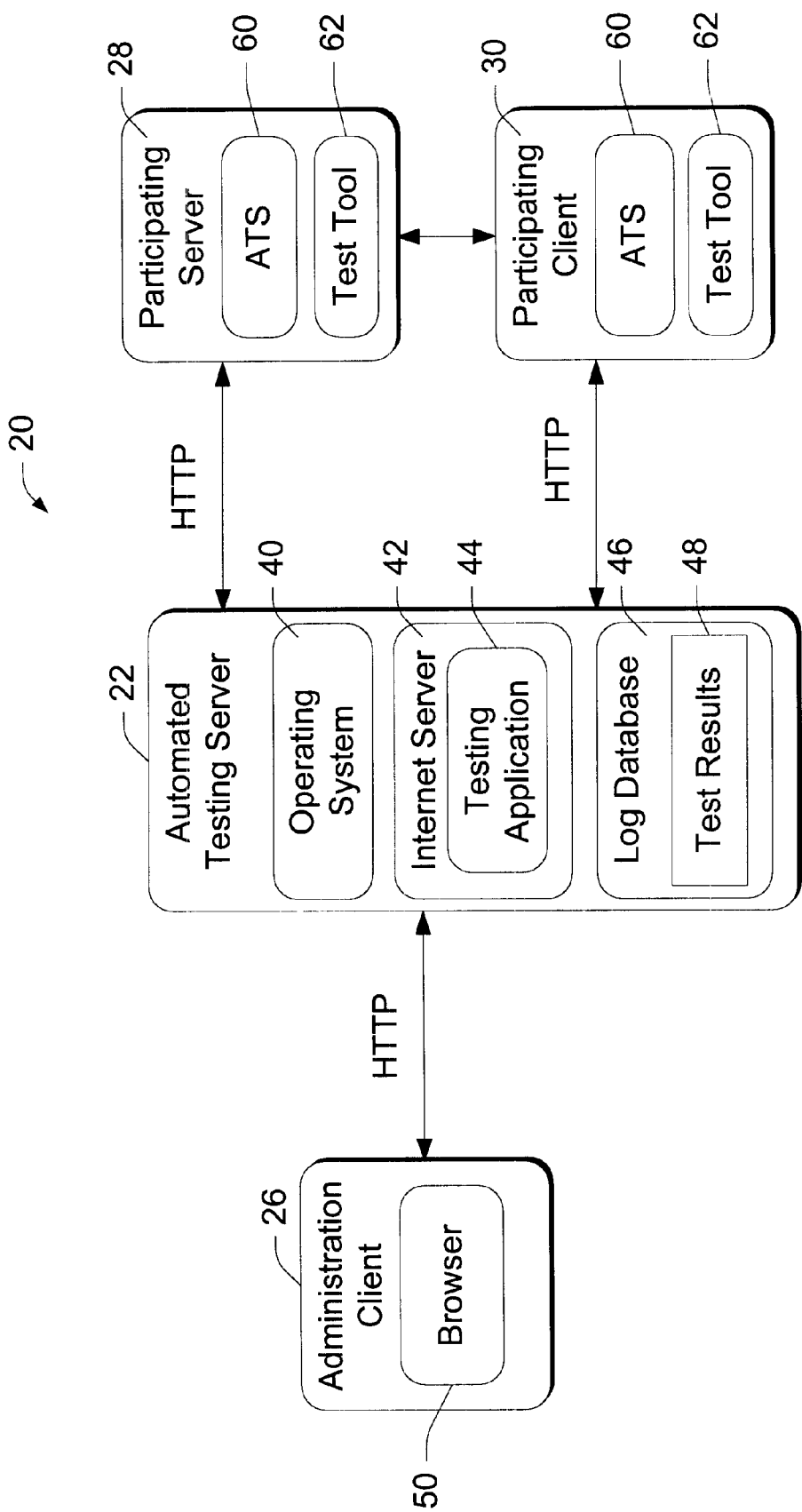
FIG. 2 shows the primary participants in the system, including an automated testing server, one or more registered servers, one or more registered clients, and a remote administration client.

FIG. 2 shows the four primary participants of the administration system 20 and the distributed software architecture implemented at various participants to implement the administration system 20. These participants include the central testing server 22, the remote administration client 26, one or more participating servers 28, and one or more participating clients 30. Communication among the participants is accomplished through IP (Internet protocol) communication, and particularly HTTP.

The central testing server 22 is implemented, for example, as a personal computer configured as a server computer or as a cluster of personal computers. The central testing server 22 has an operating system 40 and an Internet server 42 that runs atop the operating system to receive and serve HTTP messages. Preferably, the operating system is a Windows-brand operating system, such as Windows NT operating system from Microsoft Corporation, although other operating systems may be used (e.g., Unix-based operating systems). An example of the Internet server 42 is the Internet Information Server (IIS), which is also available from Microsoft Corporation.

The central testing server 22 has a testing application 44 that facilitates remote-administered stress testing of the participating server and client. The testing application 44 is shown implemented as part of the Internet server 42, but it can also be a separate standalone program or alternatively integrated into the operating system 40. The testing application 44 has three main purposes: (1) provides an interface to system resources; (2) creates a heartbeat thread; and (3) communicates with the remote administration client 26 and the participating server 28 and client 30 using HTTP requests. When implemented in a Windows-based server operating system, the testing application 44 uses the following system resources:

1) Win32 API that support .INI file read and writes;
2) CoCreateGuid for creation of a test or event ID used to coordinate the tests;
3) Sockets API to send requests to the ATS software at the participating machines;
4) Win32 API that support inter-process communication and synchronization.

One particular implementation of the testing application 44 is described in more detail below under the heading "Testing Application".

The central testing server 22 also includes a log database 46 that stores the results 48 of the automated tests. The log database can be implemented, for example, using SQL database software available from Microsoft Corporation. It is noted that this database does not have to be stored on the same machine as the central testing server. Since the testing application communicates with the database via ADO (ActiveX Data Object), the database can reside anywhere on the network.

The administration client 26 implements a Web browser 50 to access the automated testing server 22 over the Internet using standard HTTP requests. The administration client 26 may be implemented in a number of ways, including a desktop computer, laptop computer, handheld computer, thin client, or is other computing device with browser functionality.

Each participating computer that takes part in the stress testing, as represented by participating server 28 and participating client 30, is loaded with the automated testing service (ATS) software 60 to administer tests using the test tools 62 available on the machine. The automated testing service 60 performs three primary tasks: (1) registers the computer with the central testing server 22; (2) executes commands necessary to run selected test(s) on a selected participating client(s) against a selected server(s); and (3) sends test results and other loggable items produced by the legacy test tools 62 to the central testing server 22 for logging in the log database 46. The ATS software 60 is implemented as an application that runs on an operating system (not shown), such as Windows-brand operating systems. As an example, the application may be written in a scripting language, such as JavaScript from Sun Microsystems Corporation.

The application supports a user interface (UI) to permit a user to specify certain test conditions and options. The user can specify, for example, whether their machine acts as a server, a client, or both. ATS 60 can also be configured to accept only commands from the designated central testing server 22. It verifies that the commands are coming from the designated central testing server by validating the IP address of the machine that sent the command request.

Since ATS 60 is a portal to someone's machine, ATS 60 supports security measures to ensure no unauthorized access. Both the central testing server 22 and ATS 60 support digital signatures. Tests supported by the central testing server 22 are digitally signed by its developer or producer to indicate that the test has been reviewed and contains no misbehaving instructions. The user can designate via the ATS UI to allow only signed tests to run on the machine. If the user wants exclusive rights to his/her machine, ATS 60 has an option of allowing only the logged on user to select and run tests from the central testing server 22 on that machine.

Exemplary Computer

Figure 3:
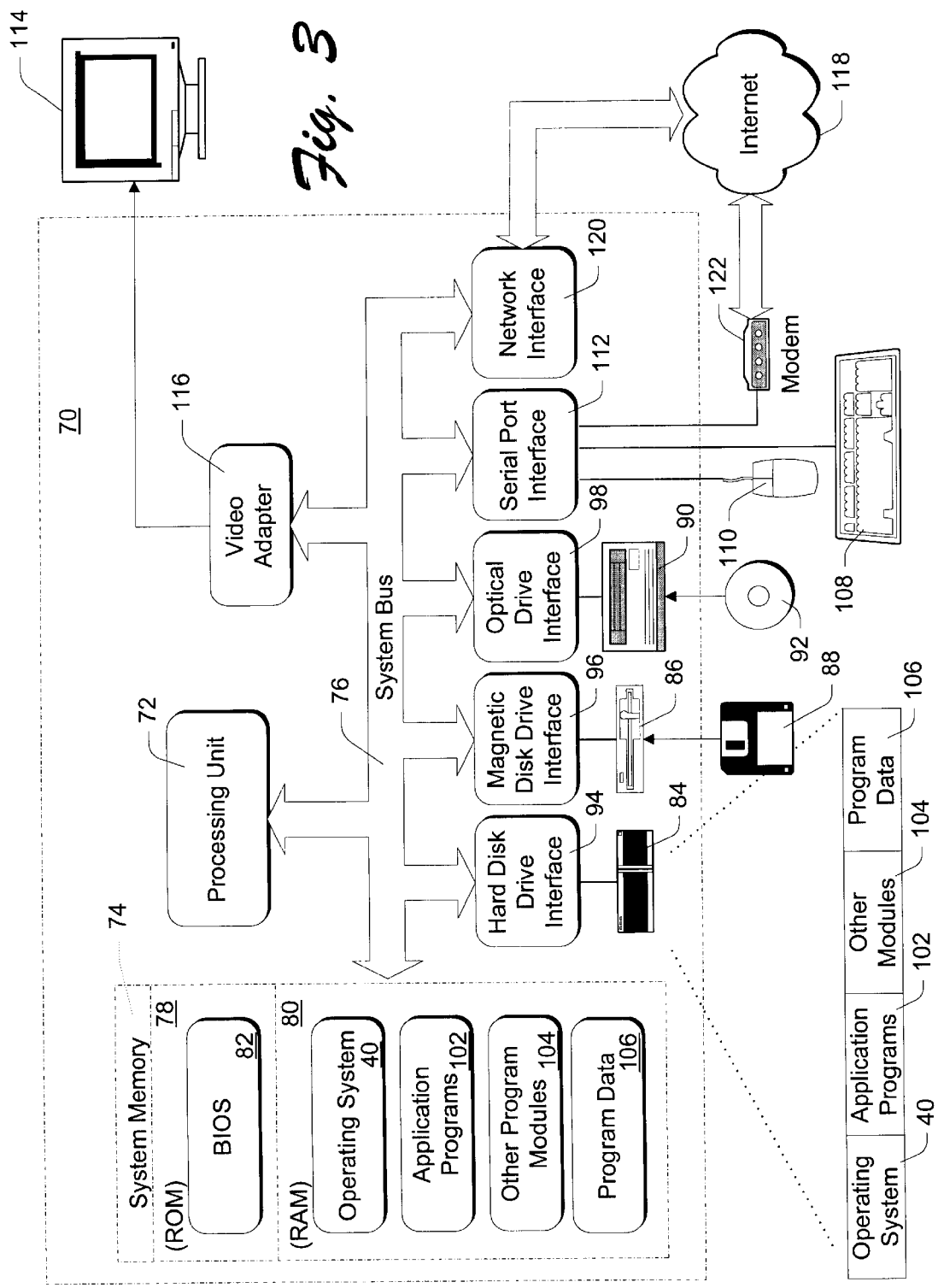
FIG. 3 shows a block diagram of a computer that can be used to implement any one of the system participants.

FIG. 3 shows an exemplary implementation of a computer used in the distributed administration system 20 including, for example, the central testing server 22, the administration computer 26, the registered servers 28 and the registered clients 30. The computer is a general purpose computer in the form of a conventional personal computer 70 that is configured to operate as a server or as a client.

The computer 70 includes a processing unit 72, a system memory 74, and a system bus 76 that couples various system components including the system memory 74 to the processing unit 72. The system bus 76 may be any of several types of bus structures including a memory bus or memory controller, a peripheral bus, and a local bus using any of a variety of bus architectures. The system memory 74 includes read only memory (ROM) 78 and random access memory (RAM) 80. A basic input/output system 82 (BIOS) is stored in ROM 78.

The computer 70 also has one or more of the following drives: a hard disk drive 84 for reading from and writing to a hard disk, a magnetic disk drive 86 for reading from or writing to a removable magnetic disk 88, and an optical disk drive 90 for reading from or writing to a removable optical disk 92 such as a CD ROM or other optical media. The hard disk drive 84, magnetic disk drive 86, and optical disk drive 90 are connected to the system bus 76 by a hard disk drive interface 94, a magnetic disk drive interface 96, and an optical drive interface 98, respectively. The drives and their associated computer-readable media provide nonvolatile storage of computer readable instructions, data structures, program modules and other data for the personal computer. Although a hard disk, a removable magnetic disk and a removable optical disk are described, other types of computer readable media can be used to store data, such as flash memory cards, digital video disks, random access memories (RAMs), read only memories (ROM), and the like.

A number of program modules may be stored on the hard disk, magnetic disk, optical disk, ROM, or RAM. These programs include an operating system 40, one or more application programs 102, other program modules 104, and program data 106. When implemented in the context of the central testing server 22, the application programs 102 and/or program modules 104 include the IIS 42, the testing application 44, and database software to manage the log database 46. When implemented in the context of the administration computer 26, the application programs 102 or program modules 104 include the browser 50. When implemented in the context of the participating server 28 or client 30, the application programs 102 or program modules 104 include the automated testing service 60.

A user may enter commands and information into the personal computer 70 through input devices such as keyboard 108 and pointing device 110. Other input devices (not shown) may include a microphone, joystick, game pad, satellite dish, scanner, or the like. These and other input devices are often connected to the processing unit 72 through a serial port interface 112 that is coupled to the system bus 76, but may be connected by other interfaces, such as a parallel port, game port, or a universal serial bus (USB). A monitor 114 or other type of display device is also connected to the system bus 76 via an interface, such as a video adapter 116. In addition to the monitor, personal computers typically include other peripheral output devices (not shown) such as speakers and printers.

The server computer 70 is connected to a network 118 (e.g., network 28 or Internet 22) through a network interface or adapter 120, a modem 122, or other means for establishing communications, over the network. The modem 122, which may be internal or external, is connected to the system bus 76 via the serial port interface 112.

Testing Application

Figure 4:
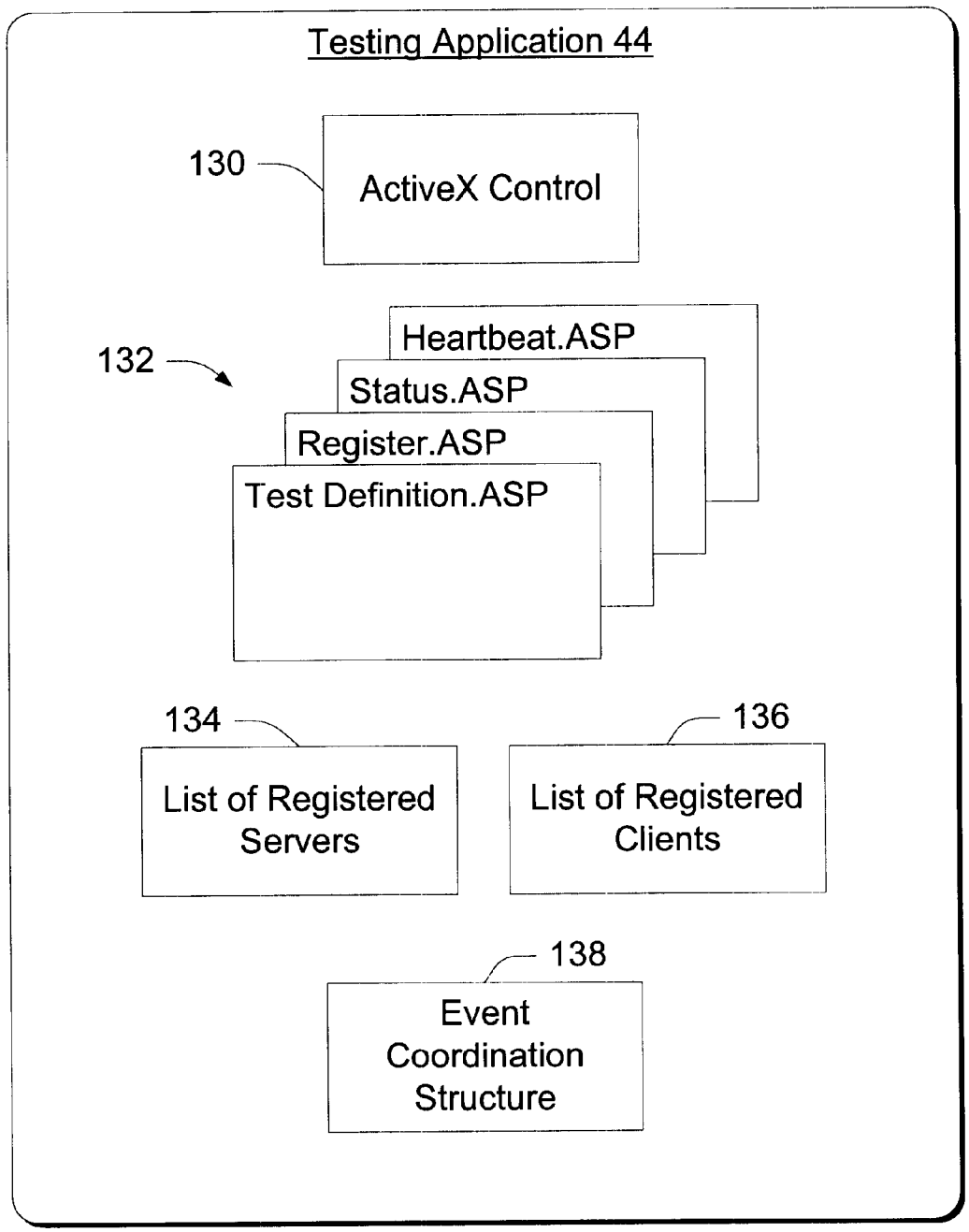
FIG. 4 shows a block diagram of functional components supported by a testing application implemented at the testing server.

FIG. 4 shows general components in the testing application 44 implemented at the testing server 22. The testing application 44 includes a control 130 formed as an ActiveX object. The control object 130 initializes internal structures and starts the testing process.

The testing application 44 has a number of Active Server Pages (ASP) 132 that are called to effectuate different operations of the testing process. In FIG. 4, example ASPs include a test definition page that is served to the administration client 26 to create a series of tests, a register page that is used by the ATS to register computers with the testing server, a status page to update the system administrator during the tests, and a heartbeat page to facilitate automated stress testing at predefined times. The control object 130 is exposed by the active server pages so that it is accessible from any Web page generated by the central testing server 22. ActiveX objects and ASP technology are well-known technologies developed by Microsoft Corporation.

The testing application 44 also maintains data structures, including a list of registered servers 134, a list of registered clients 136, and an event coordination structure 138. The server and client lists are updated when computers are registered or unregistered. The event coordination structure 138 tracks a set of events to synchronize operation of the testing process over the asynchronous distributed system. The event coordination structure is described below in more detail. with reference to FIG. 11.

Operation

Figure 5:
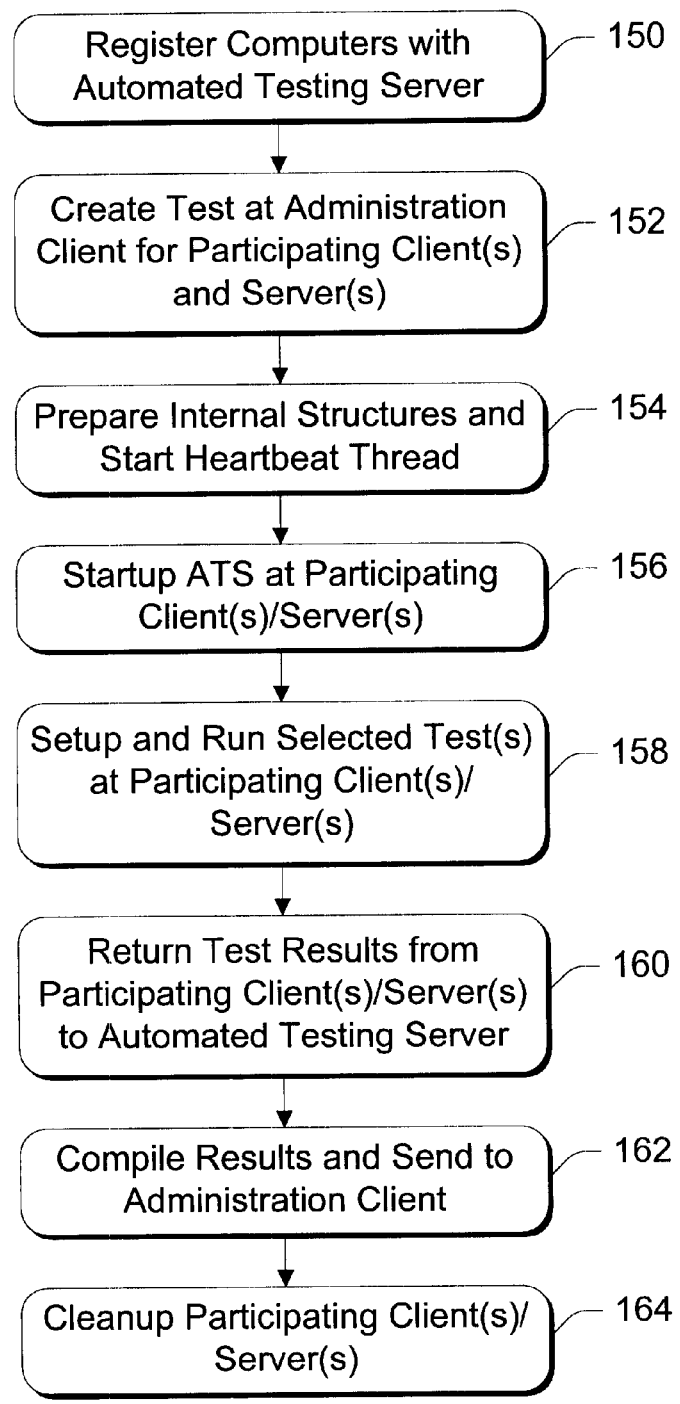
FIG. 5 is a flow diagram showing steps in a method for administering various tests over the Internet.

FIG. 5 shows steps in a method for operating the distributed and automated administration system 20. The steps are implemented in software running at various participants' computers, including the browser 50 at the remote administration client 26, the testing application 44 and log database 46 resident at the central testing server 22, and the automated testing service 60 resident at the participating servers 28 and clients 30. The steps are explained with reference to FIG. 2.

Step 150: Register Computers

At step 150, computers availing themselves to testing are registered with the central testing server 22. The computers, as represented by server 28 and client 30, are assumed to have the ATS module 60 loaded thereon. This module may be loaded locally from a disk or other storage media, or downloaded from testing server 22 as part of the registration procedure. The central testing server 22 compiles a list of registered clients and servers that can be tested.

When ATS 60 is started, it makes an registration HTTP request to a "register.asp" page in the testing application 44. The registration request includes a machine name, architecture (e.g., PowerPC, x86, alpha, etc.), operating system type (e.g., Windows 98, Windows NT, etc.), operating system version (e.g., 4.0, 5.0, etc.), and software version (e.g., IIS 4.0, build No. 115). ATS 60 sends the same registration request on a regular interval in case the initial request failed due to network connectivity issues, or in case the testing server 22 was unavailable at the time for any other reason. When the ATS application is exited, it sends another HTTP request to the testing server seeking to unregister. In response to the registration and unregistration requests, the testing server 22 adds the computer to, or removes it from, the list of registered clients and/or servers.

Step 152: Define Test(s) and Participant(s)

The system administrator can access the central testing server 22 at any time from the remote administration client 26 to initiate tests on any one of the registered computers (step 152 in FIG. 5). The system administrator uses the client browser 50 to send an HTTP request to create one or more tests. In response, the testing server serves a Web page that forms a test definition screen when rendered by the client browser 50.

Figure 6:
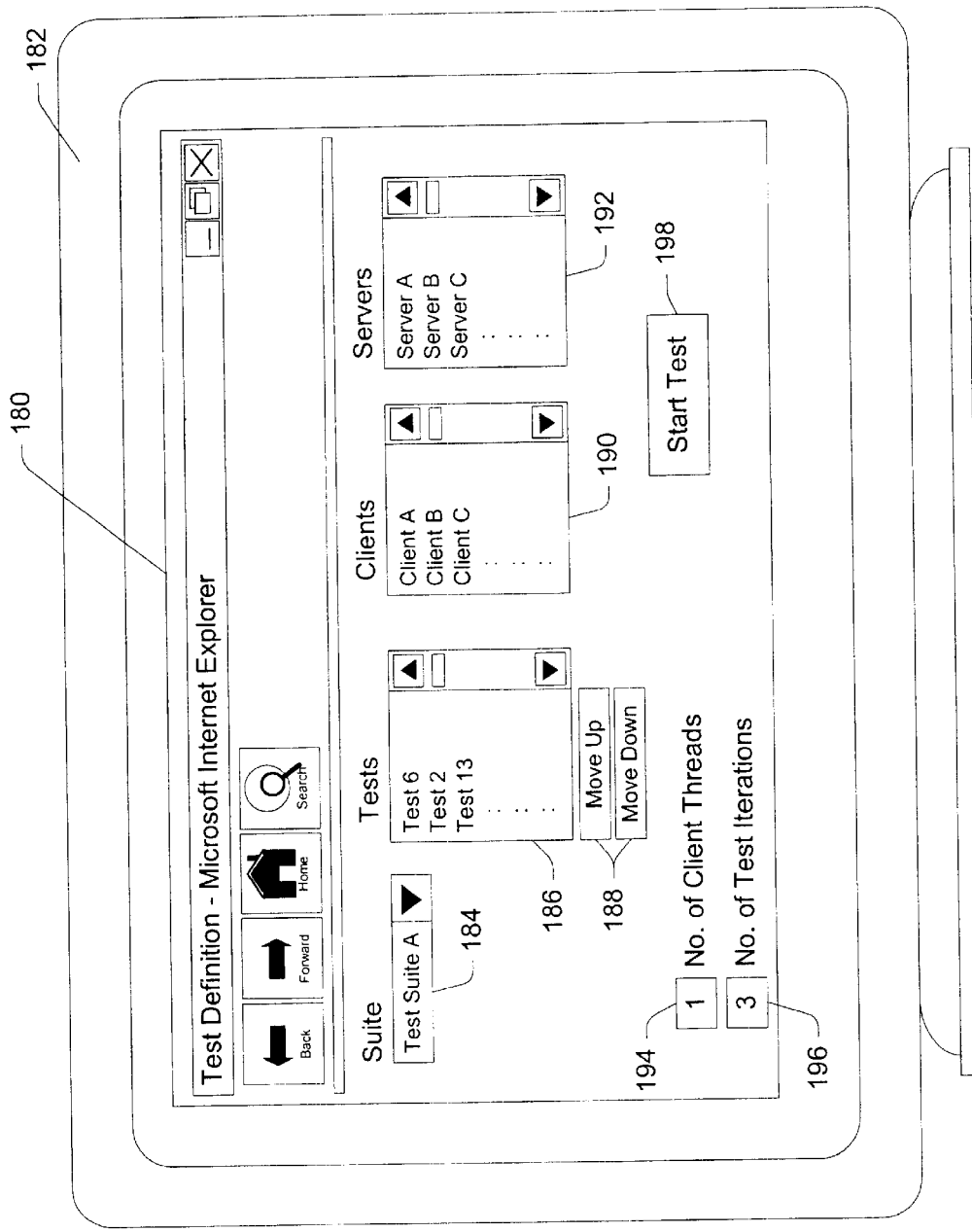
FIG. 6 shows a test page when rendered on the administration client.

FIG. 6 shows an example test definition page 180 when rendered by the browser 50 on a display 182 at the administration client 26. The test definition page 180 presents several lists that enable a system administrator to define a desired set of tests, an order for those tests, and the computers for them to run on. The test definition page 180 has a suite menu 184 that contains a list of test suites that can be performed. Each suite contains one or more tests that can be automatically performed by participating clients and servers. Examples of possible test suites include COM (component object model) tests, metabase tests, ISAPI (Internet server application program interface) tests, compiler tests, and so forth. The test suites are passed to the administration client 26 in an ".ini" file, which stores items in name-value pairs.

When the administrator picks a test suite, the tests contained in that suite are displayed in list 186. The administrator can reorder the tests using Move Up and Move Down buttons 188 to produce the desired order of running the tests.

The test definition page 180 also has a scrollable client list 190 that lists all registered clients and a scrollable server list 192 that lists all registered servers. The system administrator can select certain clients and servers from the lists 190 and 192 to participate in the tests using a point-and-click control or other control.

The test definition page 180 might also provide options to modify the behavior of the tests. For instance, page 180 has a field 194 to specify the number of client threads for the test and a field 196 for the number of iterations the test suite should be run. Other options may be provided in addition to those shown.

Once the system administrator has selected the tests, ordered them, selected the participating clients and servers, and entered any options, the administrator can actuate the "Start Test" button 198 to initiate the tests. The client browser 50 places the test information in an HTTP POST request and sends the request to the central testing server 22.

Step 154: Prepare Structure at Testing Server

With reference again to FIG. 5, the central testing server 22 receives the request and prepares to administer the tests (step 154). The testing application 44 performs the following tasks:

(1) Initializes global structures;
(2) Instantiates the ActiveX component and stores it globally to the application;
(3) Starts a heartbeat thread in the ActiveX component.

The global structures include an event coordination structure stored in memory that provides system synchronization to coordinate the various testing processes over a distributed, asynchronous network. The testing server 22 examines the event coordination structure whether the designated server is participating in other tests, and if not, begins queuing events for tests to start on that server. The event coordination structure is described below in more detail under the heading "Event Coordination Structure".

The heartbeat thread makes continuous requests to a heartbeat page in the testing application 44 so defined tasks can be executed at any given time. The heartbeat thread is described below in more detail under the heading "Heartbeat Thread".

Step 156: Startup ATS

At step 156 in FIG. 5, the ATS application is started on the participating client or server machine. The startup process is described in more detail with reference to steps in FIG. 7. These steps are performed in software at each participating client/server selected by the system administrator.

At step 200 in FIG. 7, the automated testing service 60 sends a request to the testing server 22 to determine whether a newer version of the ATS software exists. If so, the newer version is downloaded from the server to the participating computer and ATS is restarted.

At step 202 in FIG. 7, the ATS 60 requests and receives a list of the most popular tests that are generally run by the distributed test administration system. These test can be presented to a local user via the ATS UI. ATS 60 sends the registration request to the testing server 22 as part of its periodic reminder (step 204). Following steps 200–204, the participating client/server is prepared for the testing, so the final step 206 is to wait for the testing to begin.

Some tests are exclusionary, while others can coexist with one another. Locking can be used to ensure that exclusionary tests do not interfere with each other. The server is checked to see if it is running an exclusionary test and if so, the testing server is already locked. If not running an exclusionary test, the server is checked to see if the current test being started is exclusionary. If it is and the server is already running a test, the user will be returned an error stating so; otherwise, the participating server 28 is locked from use for other tests and sends the setup information (if any) to ATS 60. ATS will then execute the commands to setup the server.

Step 158: Setup and Run Test Suite

Some registered machines may not have a configuration to run the set of tests. Accordingly, the configuration details are provided ahead of time to setup both the server(s) and client(s) before the test actually starts. After setup is completed, the participating clients and servers begin running tests.

At step 158 in FIG. 5, the central testing server 22 sets up the participating clients and servers to run the suite of tests selected by the system administrator and then launches the tests. The setup and testing process is described in more detail with reference to steps in FIG. 8. These steps are performed in software at the central testing server 22 (i.e., the testing application 44 and the log database 46) and each participating server 28 and client 30 (i.e., the ATS module 60).

At step 210 in FIG. 8, the testing application 44 at the testing server 22 sends the setup file to the participating server 28. The setup file is a batch file, an ".ini" file, or other text file. The testing application 44 also sends a command line to execute on the information sent over in the setup file.

At step 212, the ATS 60 at the participating server 28 runs the command line to configure the server in preparation for the tests. When it completes setup, the participating server 28 sends an HTTP GET request informing the testing application 44 that it has completed setup and is ready to begin testing.

Upon this confirmation, the testing application 44 at the testing server 22 sends a setup file to the participating client 30 (step 214). The setup file is an ".ini" file, or other text file. The testing application 44 also sends along a command line that causes the participating client 30 to execute on the information sent over in the setup file, and open communication with the participating server 28 to begin testing. The client initiates the tests and responds with an HTTP GET message that the tests have begun (step 216).

Step 160: Report Results

At step 160 in FIG. 5, the automated testing service 60 occasionally or routinely checks the testing processes and reports results back to the central testing server 22. The testing process is described in more detail with reference to steps in FIG. 9. These steps are performed in software at the participating server 28 and/or participating client 30 (i.e., the ATS module 60).

Figure 9:
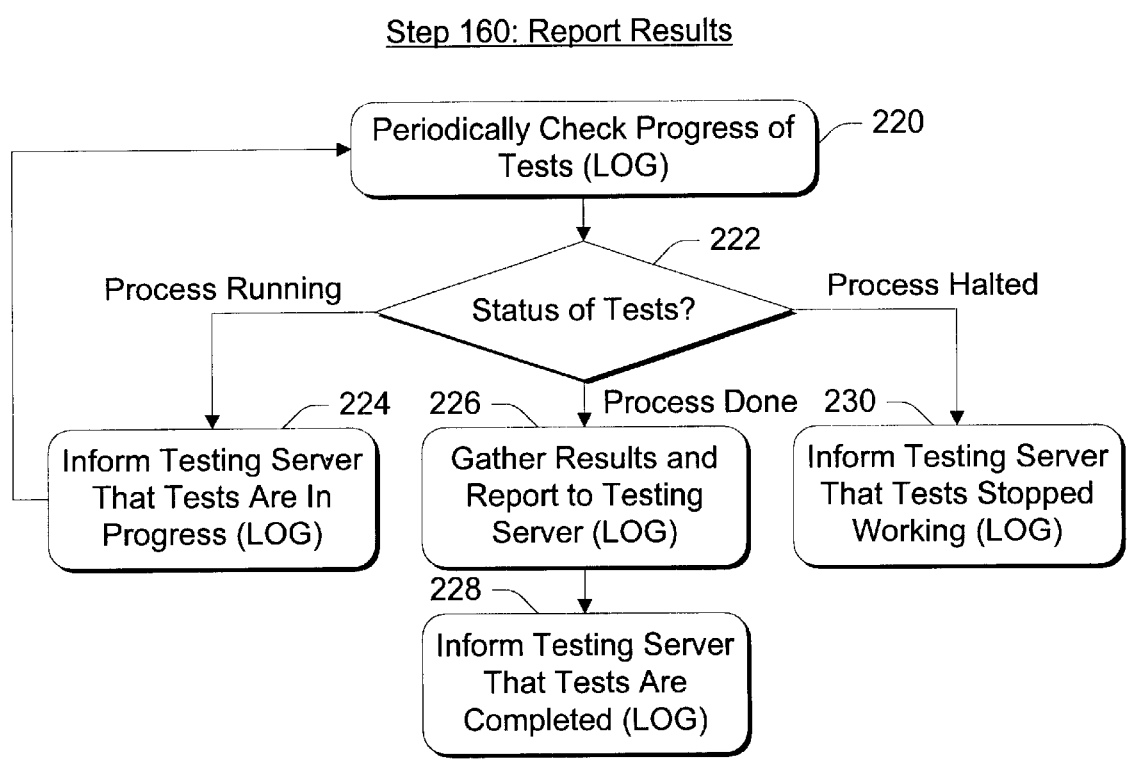
FIG. 9 is a flow diagram showing steps in a reporting process for reporting test results to system administrators.

At steps 220 and 222 in FIG. 9, the automated testing service 60 at the client or server checks the tests to see if they are running. If they are, the ATS module 60 sends an HTTP message to the central testing server 22 indicating that the tests are ongoing (step 224). If the tests have completed, the ATS module 60 gathers the results from the tests and reports the results to the testing server 22 (step 226). The ATS module 60 also informs the testing server that the tests are completed (step 228). If the tests have unexpectedly stopped running, the ATS module 60 sends an HTTP message to the central testing server 22 indicating that the tests are halted (step 230). In response to this message, the testing server 22 may attempt to restart the tests using the procedure shown in FIG. 8. In addition, the automated testing service 60 can be configured to return at least some kind of message within a specified time period of the client machine beginning the test. If the time lapses without the testing server 22 receiving a message, it may be indicative that the test has run into an error or is possibly hung.

It is noted that each step may involve a posting of a log record from the ATS module 60 to the testing server 22. This is represented in the flow diagram by the parenthetical "LOG" words in the method steps. The log record contains basic status information, and it is recorded in the log database 46. The legacy test tools 62 may not have the infrastructure to make HTTP requests to send log information to the testing server 22. However, the tools 62 have the ability to write to a log file. ATS has a defined text file format that it understands. When a test is completed, a test tool 62 can write a log file in the format that ATS understands. ATS 60 sends the log file to the testing server 22 (using an HTTP PUT command) and sends a request signaling the testing server to begin processing the log file.

Step 162: Tally Results and Report to Administrator

At step 162 in FIG. 5, the central testing server 22 receives the test results from the participating servers and/or clients. The results 48 are stored at the testing server via database software 46. The results can be tallied and organized for better presentation to the system administrator. The testing application 22 has a status ASP that forms a status page that can be served over the Internet to the remote administration client 26.

Figure 10:
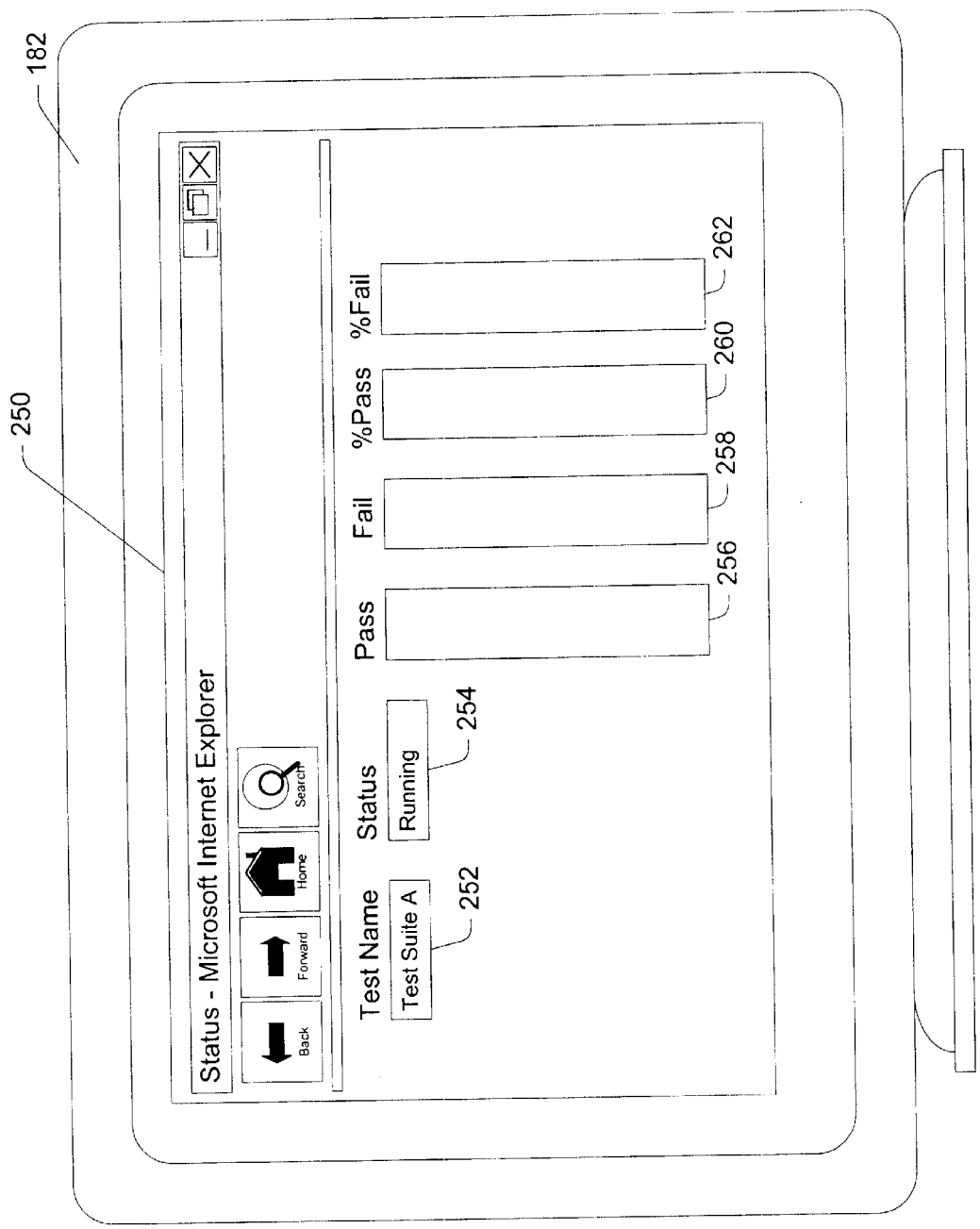
FIG. 10 shows a status page when rendered on the administration client.

FIG. 10 shows an example status page 250 when rendered by the browser 50 on a display 182 at the administration client 26. The status page includes a name field 252 for the name of the test suite, a status field 254 that lists the status of the test(s), and various metric columns 256–262 that provide some quantitative feedback to the system administrator. The metric columns can take advantage of functions in JavaScript as well as the language itself. The JavaScript "eval" function is used to compute the column metrics. Therefore, either the raw data passed in can be displayed or with the inclusion of JavaScript language constructs sophisticated metrics can be computed and displayed. Using any scripting language with functionality similar to "eval" offers great flexibility in the data collection and computation model if applied in a similar fashion. Through this status page, which can be periodically refreshed, the system administrator can watch the tests as they are running.

The fields and metric columns can be defined by the test developer to present the information for any given test or suite of tests. The test developer creates a column definition file that explains to the status ASP how to format, compute and present the test results to the system administrator.

The testing application 22 also has a log ASP that can be called to form a Web page for the log data received from the ATS modules 60. The log page shows more particular event-by-event information as the tests proceed.

Step 164: Cleanup

At step 164 in FIG. 5, the central testing server 22 sends a cleanup file to the ATS 60 at the participating server 28 after the tests complete. The cleanup file is a batch file, an ".ini" file, or other text file. The testing application also sends a command line to execute on the information set up in the cleanup file.

Event Coordination Structure

The automated testing process described above is performed over a distributed, asynchronous network using HTTP messaging. Furthermore, there is no set time on how long it might take for the server to setup, or the client to become ready, or to process a test, and so on. Accordingly, the process requires some synchronization to manage the test definition, the test setup at the participating clients and servers, the running of the tests, the reporting of test results, and the providing of status updates. To provide process synchronization, the central testing server 22 builds an internal event coordination structure that tracks and coordinates multiple events to ensure that the steps of the testing process occur in a prescribed order.

Figure 11:
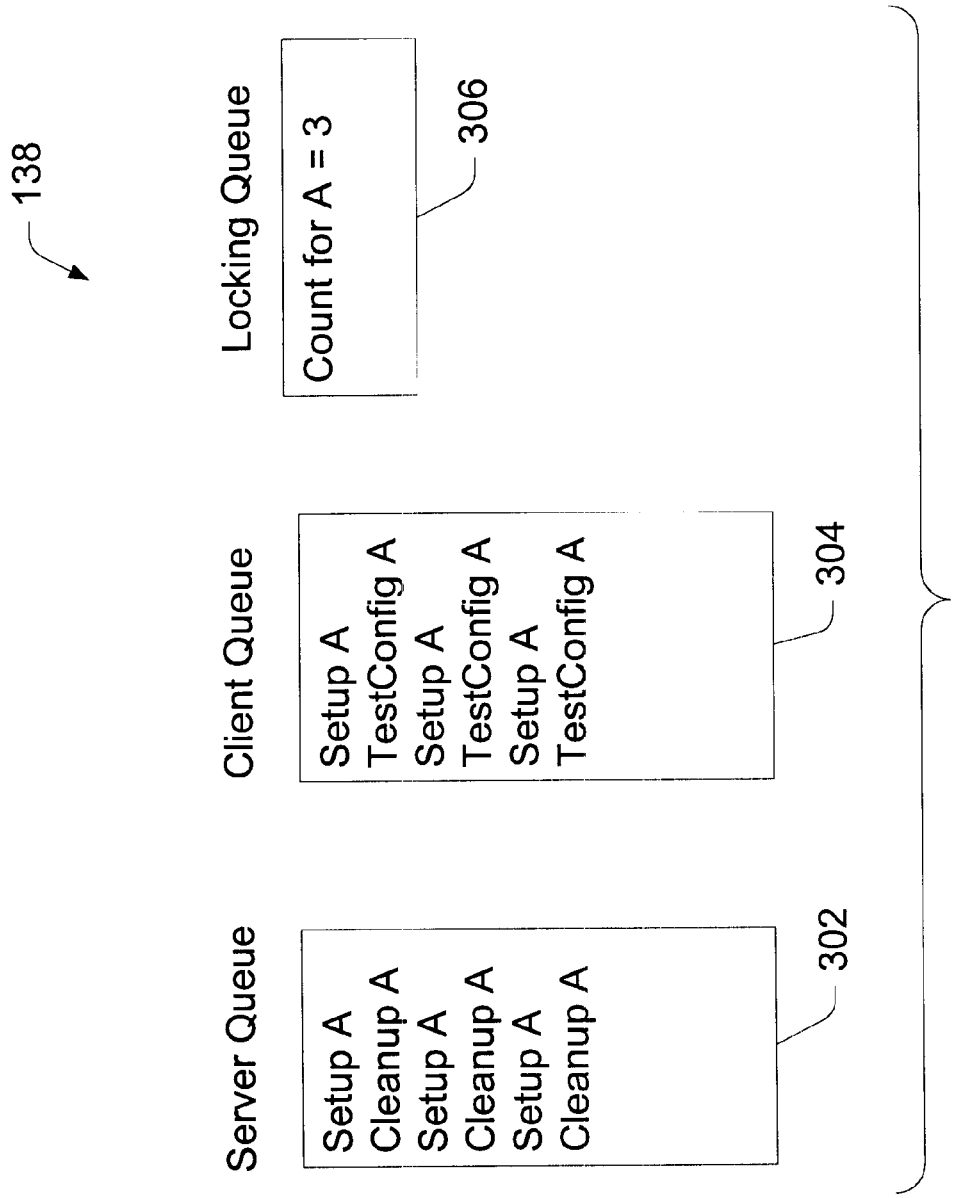
FIG. 11 shows a data structure stored at the testing server to synchronize operation of the testing process.

FIG. 11 shows an event coordination structure 138 according to one implementation. It is stored in memory at the testing server 22. The event coordination structure 138 includes a participating server queue 302 to hold events pertaining to the server 28, a participating client queue 304 to hold events pertaining to the client 30, and a locking queue 306. The testing server fills the event coordination structure 138 with events that will occur throughout the testing process, beginning with setup and ending with cleanup. The events are identified to with an event ID to logically associate all events for a suite of tests. The event ID is set in response to launching one suite of tests, for instance, when the system administrator clicks the "Start Test" button 198. The event ID can be a monotonically increasing value assigned by the central testing server.

In this example, the server queue 302 includes a "setup A", meaning that the event is the setup step defined in step 156 for the test suite having an ID of "A". The server queue 302 also has a "cleanup A". The system administrator may specify in the test definition that the tests are to run multiple times. A test count is maintained in the locking queue 306. If multiple runs are specified, the server queue 302 might include multiple repetitions of the same setup and cleanup events. FIG. 11 illustrates the case where the system administrator specified running the tests three times, and hence three sets of events for test suite A are loaded into the server queue 302.

The client queue 304 holds events pertaining to the participating client 30. These events include a setup event and a test configuration event. The latter event pertains to the various tests that are to be run as part of the test suite and their order as specified by the system administrator (e.g., tests 6, 2, 13, etc.). If the test suite is to be run multiple times, the setup and test configuration events are listed multiple times.

The event coordination structure 138 assists the testing server 22 in synchronizing operation. The testing server 22 begins by popping "setup A" from the server queue 302 to trigger the sending of the setup HTTP message to the participating server 28 as described above with respect to step 158 in FIG. and more particularly, step 210 in FIG. 8. After the server replies with a message indicating that it has finished setup, the testing application 44 pops the "setup A" event and the "test configuration A" event from the client queue 304. This causes the testing application to send the setup file to the participating clients 30, as described in step 214 of FIG. 8.

When the client finishes the tests, it returns a message indicating test completion. At this point, the testing application 44 pops "cleanup A" from the server queue 302 to trigger sending the cleanup HTTP message to the participating servers. When the testing application 44 receives notice that cleanup has finished, it looks up in the locking queue 306 for the test count of the same event ID and decrements that count by one. In this case, the count is decremented from three to two. The testing application 44 then repeats the series of tests by popping the next "setup A" event from the server queue 302.

When the test count is finally decremented to zero, the tests are completed and the server is unlocked if it was locked so it can be reused. The testing application 44 sends the final results to the system administrator.

Heartbeat Thread

One benefit of the administration system is that a user can configure any machine to begin running stress or functional tests at any specified time. For instance, the machines can run tests during off hours, and report results by the time the administrators arrive at work. The testing application 44 has a heartbeat thread that keeps time for automated tests. When the specified testing time arrives, the heartbeat thread calls a heartbeat ASP that includes instructions to perform the automated stress tests on a periodic basis and to cleanup the server following the tests. The heartbeat ASP obtains the configuration information and sends it to the registered server. If the server is not running a test, the ATS module 60 will configure the machine for the specified stress and execute the commands.

The machines run the tests automatically and send results to the central testing server. A system administrator can use a browser to call the status ASP and retrieve the results. With the Web page interface, the administrator can monitor the test results from anywhere. This eliminates the need for someone to gather stress or stress data each morning and send status to interested parties.

Conclusion

The distributed and automated test administration architecture has many benefits. It allows a system administrator to administer stress or functional tests on any registered computer located anywhere on the Internet from a remote browser-based computer also located anywhere on the Internet. The architecture presents a common Web page interface to permit system administrators and even non-technical personnel to define a series of tests, select the participating machines, and launch the tests. The architecture employs standard IP (Internet protocol) messaging, such as HTTP (hypertext transport protocol) messages, to pass test execution information and test data among the central testing server, the browser-based computer, and the participating machines. As a result, the architecture is platform independent as the central testing server need not known the platform of a client or server.

Another advantage is that the architecture is test independent, yet defines a common interface for test execution. By supporting Internet protocols, any browser on any machine can review data and kick off tests from essentially anywhere on the Internet.

Although the invention has been described in language specific to structural features and/or methodological steps, it is to be understood that the invention defined in the appended claims is not necessarily limited to the specific features or steps described. Rather, the specific features and steps are disclosed as preferred forms of implementing the claimed invention.

What is claimed is:

1. A distributed test administration system comprising:

a central testing server;

an administration client remote from, but accessible to, the testing server over an IP (Internet protocol) network, the administration client enabling a user to define a test;

one or more participating computers remote from, but accessible to, the testing server over the IP network;

the central testing server being configured to receive the test from the administration client and to coordinate the participating computers to perform the test;

the participating computers running the test and returning test results to the central testing server; and the central server reporting the test results to the administration client.

2. A distributed test administration system 1, wherein communication exchanged between the testing server, the administration client and the participating computers is compliant with HTTP (hypertext transport protocol).

3. A distributed test administration system 1, wherein the central testing server and the participating computers execute the test automatically.

4. A distributed test administration system 1, wherein the central testing server and the participating computers execute the test automatically at a predetermined time.

5. A distributed test administration system 1, wherein the central testing server executes a testing application that generates a test page to serve to the administration client, through which the user can define the test.

6. A distributed test administration system 1, wherein the central testing server executes a testing application that generates a status page to serve to the administration client to present the test results.

7. A distributed test administration system for enabling a system administrator to test one or more servers accessible by the Internet from a remote administration computer that implements a browser, the remote administration location comprising;

a central testing server;

one or more clients registered with the central testing server;

one or more servers registered with the central testing server;

a testing application executing at the testing server to generate a test page that can be served to the browser of the remote administration computer using an Internet protocol (IP), the test page containing test information and functionality so that when rendered by the browser enables the system administrator to specify at least one test, at least one participating server from among the registered servers, and at least one participating client from among the registered clients;

the testing application having a coordination system that coordinates execution of the test on the participating client and the participating server by sending out IP-compliant coordination messages to set up the participating server and to start the participating client running the test in conjunction with the participating server;

a testing service executing at both the participating client and the participating server, the testing service being responsive to the coordination messages to perform the test and to gather test results from the tests, the testing service further sending IP-compliant result messages containing the test results to the testing application at the central testing server, and a database resident at the central testing server to store the test results received from the testing service.

8. A distributed test administration system as recited in claim 7, wherein the testing application generates a status page that can be served to the browser of the remote administration computer to present the test results obtained as a result of running the test on the participating client and the participating server.

9. A distributed test administration system as recited in claim 7, wherein the coordination messages and the result message conform to HTTP (hypertext transport protocol).

10. A distributed test administration system as recited in claim 7, wherein the coordination system comprises an event coordination structure that is loaded with multiple triggering events when a test is initiated, the testing application sequentially invoking the triggering events to synchronize initiation of the participating client and the participating server to perform the test.

11. A distributed test administration system as recited in claim 7, wherein the test page presents a list of test suites, each test suite containing one or more tests, and the test page providing a control to enable that system administrator to order the tests within the test suites.

12. A distributed test administration system as recited in claim 7, wherein the test page presents a scrollable list of registered clients and a scrollable list of registered servers, the test page further providing a control to enable that system administrator to select the participating client from the list of registered clients and to select the participating server from the list of registered servers.

13. A software architecture for a distributed test administration system, the software architecture being implemented as computer programs stored on storage media, comprising:

an active server page to produce a test page that can be served to a browser, the test page containing test information and functionality to enable a user to define through the browser a test to be run on at least one computer and to submit this test in return message;

a control object, responsive to the retain message, to initiate a testing cycle that involves sending one or more test messages to initiate the test at the computer;

a testing service, responsive to the test initiation message, to perform the test on the computer and to report results from the test; and a database to store the test results reported by the testing service.

14. A software architecture as recited in claim 13, wherein the active server page, the control object, and the database reside at a central testing server, and the testing service resides at the computer being tested.

15. A software architecture as recited in claim 13, wherein the return message, the test initiation message, and the results are transferred according to an Internet protocol.

16. A software architecture as recited in claim 13, further comprising a browser to render the test page.

17. A software architecture as recited in claim 13, further comprising another active server page to produce a status page that can be served to the browser, the status page containing the results from the test.

18. A software architecture as recited in claim 13, further comprising another active server page to produce a registration page that facilitates registration of each of the computers.

19. A software architecture as recited in claim 18, further comprising a list structure to hold an identity of the computers that are registered.

20. A software architecture as recited in claim 19, wherein the test page further contains the identity of the registered computers to enable the user to select a set of one or more participating computers from among the registered computers.

21. A software architecture for a distributed test administration system for testing computers over the Internet, the software architecture being implemented as computer programs stored on storage media, comprising:
    a testing application resident at a testing server, the testing application generating a test page that can be served to a browser using an Internet protocol (IP), the test page containing test information and functionality to enable a user to create an IP-compliant test message that specifies one or more tests, an order of the tests, and one or more participating computers on which to run the tests, wherein the test message is returned to the testing application;
    a testing service resident at each of the participating computers to run the tests defined in the test message, gather test results from running the tests, and send out IP-compliant result messages containing the test results; and
    the testing application coordinating execution of the tests by sending IP-compliant coordination messages to the testing service at each of the participating computers and compiling the test results returned in the result messages from the testing service.

22. A software architecture as recited in claim 21, wherein the test message, the coordination messages, and the result message conform to HTTP (hypertext transport protocol).

23. A software architecture as recited in claim 21, wherein the testing application further generates a status page fat can be served to a browser, the status page containing the test results.

24. A software architecture as recited in claim 21, wherein the testing application further generates a registration page that can be served to the testing service to facilitate registration of the participating computer.

25. A software architecture as recited in claim 24, wherein the testing application maintains a list of the computers that are registered and presents this list as part of the test page served to the browser so that the user can select the participating computers from among the registered computers.

26. A software architecture as recited in claim 21, wherein the testing application has a timing mechanism to initiate sending the IP coordination messages at a predetermined time.

27. A software architecture as recited in claim 26, wherein the testing service runs the tests automatically at the is predetermined time application in response to receiving the IP coordination messages from the testing application.

28. A software architecture as recited in claim 21, further comprising a browser to render the test page.

29. A software architecture as recited in claim 21, fiber comprising an event coordination structure that holds multiple events that order communication with the participating computers.

30. A software architecture for a distributed test administration system for testing computers over an IP (Internet protocol) network, the software architecture being implemented as computer programs stored on storage media, comprising:
    automated testing services installed at a participating client and at a participating server,
    a testing application installed at a central testing server remote from the participating client and the participating server, the testing application sending IP-compliant messages to the automated testing services to initiate one or more tests to run on the participating client in conjunction with the participating server to test the participating client;
    the automated testing services gathering test results from the tests and returning IP-compliant messages containing the test results to the testing application; and
    a database installed at the central testing server to store the test results.

31. A software architecture as recited in claim 30, wherein the automated testing services return the IP-compliant messages within a specified time.

32. A testing application, embodied as computer-executable instructions on a computer, comprising:
    first code means for registering clients computers and servers; second code means for serving a test definition page containing test information and functionality so that when rendered by a browser enables a user to specify at least one test, at least one participating server from among the registered servers, and at least one participating client computer from among the registered clients computers; and
    third code means for coordinating execution of the test of the participating client computer in conjunction with the participating server.

33. A testing application as recited in claim 32, further comprising fourth code means for compiling results from the tests.

34. A testing application as recited in claim 33, further comprising fifth code means for serving a status page that presents test results to the user when rendered on the browser.

35. A method for testing computers over an IP (Internet protocol) network, comprising the following steps:
    enabling a remote administrator to specify via a browser a participating client, a participating server, and a test to be run on the participating client in conjunction with the participating server;
    exchanging IP-compliant messages with the participating client and the participating server to set up and run the test;
    compiling test results from running the test; and
    presenting the test results to the administrator via the browser.

36. A method as recited in claim 35, wherein the enabling step comprises the step of serving a test page to the browser, a the test page containing a list of clients, a list of servers, and a list of tests that can be run on the clients and servers.

37. A method as recited in claim 35, wherein the enabling step comprises the following steps:
    serving a test page to the browser, the test page containing a list of clients, a list of servers, and a list of tests that can be run on the clients and servers;
    rendering the test page at the browser;
    enabling the administrator to select, via the test page, at least one participating client from the list of clients and at least one participating server from the list of servers;

enabling the user to specify one or more of the tests to be run on the participating client in conjunction with the participating server, forming an IP-compliant test message identifying the participating client, the participating server, and the tests; and returning the test message from the browser.

38. A method as recited in claim 35, wherein the exchanging step comprises the following steps:

passing an IP-compliant setup message to the participating server;

setting up the participating server to run the tests;

returning an P-compliant setup complete message from the participating server to the central testing server indicating set up is complete;

passing an IP-compliant start message from the central testing server to the participating client; and running the tests from the participating client against the participating server.

39. A method as recited in claim 35, wherein the presenting step comprises the following steps:

serving a status page from the central testing server to the remote location, the status page containing the test results; and rendering the status page at the remote location to present the test results to the user.

40. A method as recited in claim 35, further comprising coordinating the tests by establishing a set of events, and performing the events in order to synchronize communication with the participating client and the participating server.

41. A method for testing computers over an IP (Internet protocol) network, comprising the following steps:

registering one or more clients with a central testing server, registering one or more servers with the central testing server, serving a test page from the testing server to a remote location on the network, the test page containing a list of the registered clients, a list of the registered servers, and a list of tests that can be run on the registered clients and servers;

rendering the test page at the remote location;

enabling a user to select, via the test page, at least one participating client from the list of registered clients and at least one participating server from the list of registered servers;

enabling the user to specify one or more of the tests to be run on the participating client in conjunction with the participating server;

forming an IP-compliant test message identifying the participating client, the participating server, and the tests;

passing test message from the remote location to the central testing server, passing an IP-compliant setup message from the central testing server to the participating server;

setting up the participating server to run the tests;

returning an IP-compliant setup complete message from the participating server to the central testing server indicating set up is complete;

passing an IP-compliant start message from the central testing server to the participating client;

returning the tests from the participating client against the participating server;

returning IP-compliant test result messages from the participating client to the central testing server, the test result messages containing test results from running the tests;

storing the test results at the central testing server;

serving a status page from the central testing server to the remote location, the status page containing the test results; and rendering the status page at the remote location to present the test results to the user.

42. Computer-readable media storing computer-executable instructions for performing steps comprising:

enabling a remote administrator to specify via a browser a participating client, a participating server, and a test to be run on the participating client in conjunction with the participating server;

exchanging IP-compliant messages with the participating client and the participating server to set up and run the test;

compiling test results from running the test; and presenting the test results to the administrator via the browser.

43. Computer-readable media distributed at a remote browser-enable computer, at a central testing computer, at registered clients and registered servers, the computer-readable media storing computer-executable instructions for performing steps comprising:

registering one or more clients with a central testing server, registering one or more servers with die central testing server;

serving a test page from the testing server to a remote location on the network, the test page containing a list of the registered clients, a list of the registered servers, and a list of tests that can be run on the registered clients and servers;

rendering the test page at the remote location;

enabling a user to select, via the test page, at least one participating client from the list of registered clients and at least one participating server from the list of registered servers;

enabling the user to specify one or more of the tests to be run on the participating client in conjunction with the participating server;

forming an IP-compliant test message identifying the participating client, the participating server, and the tests;

passing test message from the remote location to the central testing server;

passing an IP-compliant setup message from the central testing server to the participating server;

setting up the participating server to run the tests;

returning an IP-compliant setup complete message from the participating server to the central testing server indicating set up is complete;

passing an IP-compliant start message from the central testing server to the participating client;

running the tests from the participating client against the participating server;

returning IP-compliant test result messages from the participating client to the central testing server, the test result messages containing test results from running the tests;

storing the test results at the central testing server;

serving a status page from the central testing server to the remote location, the status page containing the test results; and rendering the status page at the remote location to present the test results to the user.

* * * * *

UNITED STATES PATENT AND TRADEMARK OFFICE
CERTIFICATE OF CORRECTION

PATENT NO. : 6,662,217 B1
DATED : December 9, 2003
INVENTOR(S) : Godfrey et al.

It is certified that error appears in the above-identified patent and that said Letters Patent is hereby corrected as shown below:

Column 7,
Line 29, delete "." between "detail" and "with".
Line 50, replace "an" with -- a --.

Column 8,
Line 51, replace "an" with -- a --.

Column 14,
Line 51, replace "retain" with -- return --.

Column 15,
Line 43, replace "fat" with -- that --.
Line 60, delete "is" between "the" and "predetermined".
Line 65, replace "fiber" with -- further --.

Column 17,
Line 62, replace "returning" with -- running --.

Column 18,
Line 25, replace "die" with -- the --.

Signed and Sealed this

Second Day of March, 2004

JON W. DUDAS
*Acting Director of the United States Patent and Trademark Office*